Nov. 1, 1960
R. G. X. BOUSSU ET AL
2,958,359
PNEUMATIC TIRE CASING
Filed Feb. 11, 1958
2 Sheets-Sheet 1
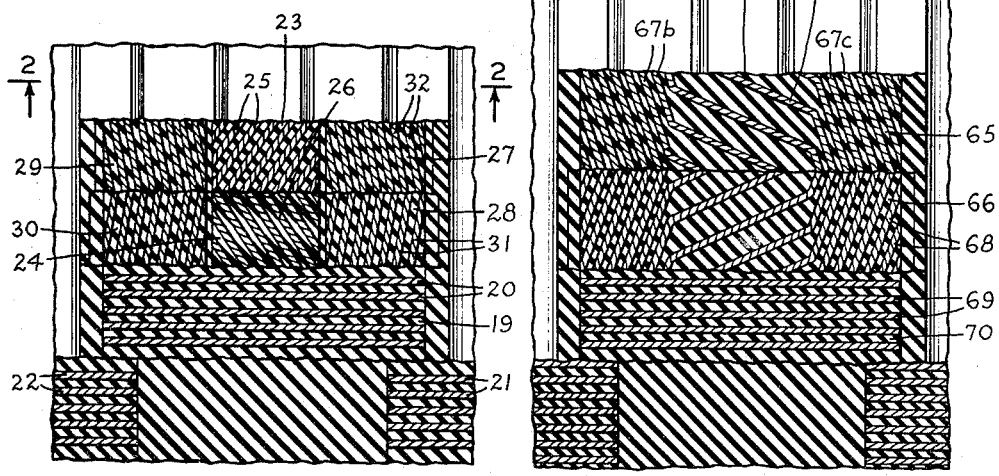
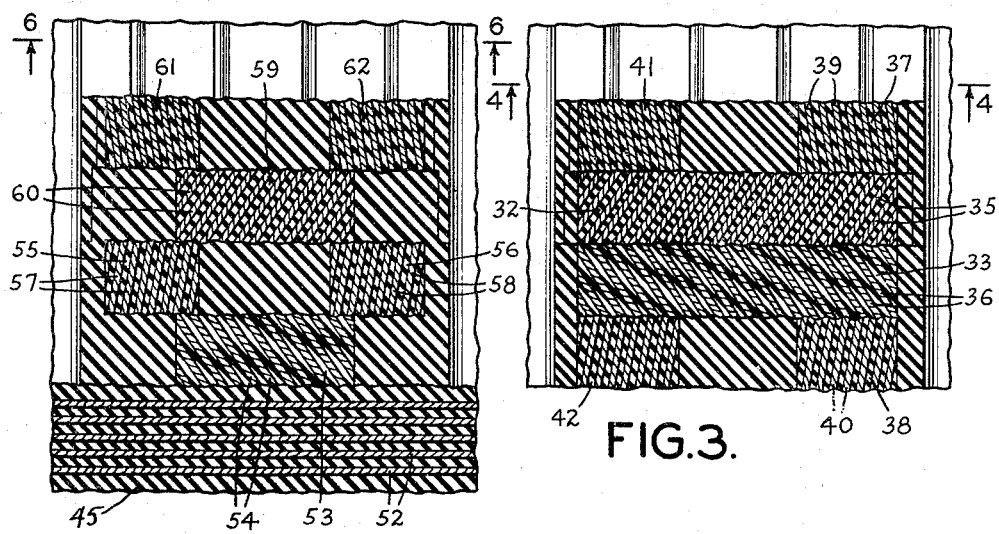
INVENTORS
ROGER GABRIEL XAVIER BOUSSU
LOUIS PIERRE FRANCOIS ANDRE NEUVILLE
LOUIS HENRI NOEL SAINT-FRISON
BY
THEIR ATTORNEYS

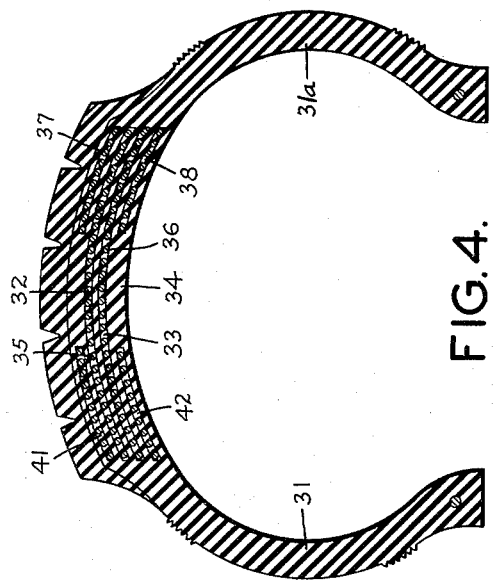
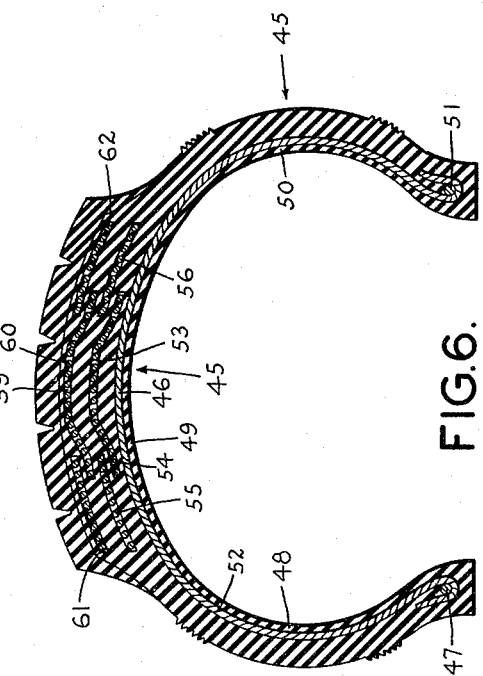
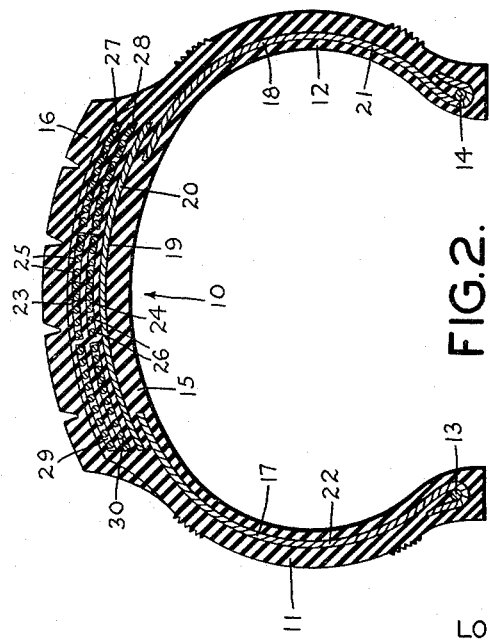

United States Patent Office 2,958,359
Patented Nov. 1, 1960

2,958,359

PNEUMATIC TIRE CASING

Roger Gabriel Xavier Boussu, Chamalieres, and Louis Pierre Francois Andre Neuville and Louis Henri Noël Saint-Frison, Clermont-Ferrand, France, assignors to Compagnie General des Etablissements Michelin (Robert Puiseux & Cie), Clermont-Ferrand, France Filed Feb. 11, 1958, Ser. No. 714,604

Claims priority, application France Feb. 16, 1957

15 Claims. (Cl. 152—354)

This invention relates to vehicle tires and it relates more particularly to improvements in the structure of pneumatic tire casings for automobiles, trucks, buses and the like to reduce wear on the tire casings and increase their operating life.

One of the principal causes of wear in tires is the deviation stress (laterally-directed stress) thereon during cornering (turning) while traveling at relatively high speeds. The deviation stress causes deformation of the area of the tread in contact with the road so that the normally elliptical contact area becomes somewhat kidney shaped and the trailing end of the kidney-shaped contact area slides relative to the road, thereby wearing away the tread.

To overcome this, it has already been proposed to arrange in the central part of the tread zone cables parallel with the equator and to dispose in the lateral edges of the tread zone cables inclined to the equator of the tire in two different directions. But this arrangement is not satisfactory because the contact area of such a tire may still be deformed transversely and assume a kidney-like shape, the cables of the central part being located in what may be called the zone of the neutral fiber (i.e. subjected to neither compression nor tension stresses), whereas the lateral lozenges on both sides of the elliptical contact area are free to expand or to contract.

The present invention relates to tire casings which are constructed to resist deformation of the portion of the tread in contact with the road by deviation stresses. More particularly, tire casings in accordance with the present invention are constructed to render the lateral edges of the apex (tread zone) of the tire casing highly resistant to deformation by deviation stresses so that the area of the tread in contact with the road remains substantially elliptical in shape during cornering of the vehicle. Avoidance of deformation of the contact area of the tread not only decreases wear of the tread, but it also improves the resistance of the tire to skidding during cornering and thereby provides greatly improved roadability.

In accordance with the invention, the improved resistance to deformation of the tire casing is achieved by providing at the apex (tread zone) of the tire casing three circumferential zones extending generally parallel with the equator of the tire casing, the central zone extending along the equator of the tire and the other zones being disposed laterally on each side of the central zone and being of greater rigidity than the central zone. The greater rigidity of the lateral zones as compared with the central zone is obtained by reinforcing the tire casing with cords, threads, wires, or cables, referred to hereinafter as cables, formed of materials which are substantially non-compressible axially, such as metal wires or filaments, glass filaments, and suitably treated natural or synthetic fibers or filaments, which are more sharply inclined to the equator of the tire or disposed at a smaller angle in the lateral zones than the cables in the central zone of the tire. Additional stiffening of the lateral zones as compared with the central zones can be accomplished by means of structural modifications, such as: (1) by the use of more rigid reinforcing cables in the lateral zones than in the central zone; (2) by embedding the cables in rubber of a higher modulus of elasticity in the lateral zones than in the central zone; (3) by arranging bands or strips of plies in the lateral zones so that the cables therein are parallel to each other and parallel to the equator of the tire and arranging in the central zone other strips or bands containing cables which are inclined at a large angle to the equator of the tire; (4) by providing additional strips of crossed cables which are sharply inclined with respect to each other and to the equator in the lateral zones superimposed on other layers of crossed layers of cables extending through the central and lateral zones; (5) by reinforcing the lateral zones with plies having cables lying in the meridian planes of the tire, or combinations of the enumerated structural modifications.

In each modification of the tire casings, the cables in the lateral zones are inclined at a smaller or sharper angle to the equator of the tire than the cables in the central zone of the tire and, hence, are much more resistant to deformation or deflection by laterally-directed or deviation stresses.

It is also preferred to arrange the layers of plies in such a manner that in conjunction with another ply or plies a triangulated formation of the cables is produced in the apex or tread zone of the tire.

The lateral zones and the central zone of the apex of the tire or tire casing may contain separate, narrow plies having cables of different inclinations therein, or a ply may extend through all of the zones, this ply being formed of cables which are bent so that their end portions lying in the lateral zones are inclined more sharply to the equator than the centrally-located portion of the cables. When a plurality of narrow strips are disposed side-by-side in the central and lateral zones of the apex of the tire or tire casing, the edges of these strips may be overlapped, the extent of overlap, however, being limited to between about ⅙ and ¼ of the width of the reinforcing ply strip in the central or median zone.

Apex reinforcing plies of the type described can be used with a conventional carcass including one or more carcass plies, or they may be used in conjunction with a carcass which is completely devoid of carcass plies and has its sidewalls or portions thereof formed of rubbery material, such as, natural or synthetic rubber having a high modulus of elasticity, as disclosed in the Bourdon U.S. application Serial No. 558,785, filed January 12, 1956, now abandoned. In all forms of the invention, the reinforcement and rigidifying of the apex of the tire or tire casing prevents kidney-shaped deformation of the area of the tire tread in contact with the road so that the wear on the tires is measurably decreased.

For a better understanding of the present invention, reference may be had to the accompanying drawings in which:

Fig. 1 is a plan view of a tire or tire casing of the type embodying the present invention with portions of the tire casing broken away to disclose the arrangement of the reinforcing plies of cables therein;

Figure 2 is a view in cross section through a tire casing of the type shown in Figure 1 and taken on line 2—2 of Figure 1;

Figure 3 is a plan view of a portion of a modified form of tire casing embodying the present invention with portions of the tire casing broken away to disclose the arrangement of the plies therein;

Figure 4 is a view in cross section of a tire casing taken on line 4—4 of Figure 3;

Figure 5 is a plan view of a still further modification of a tire casing embodying the present invention with portions thereof broken away to disclose the arrangement of the plies therein;

Figure 6 is a view in cross section of the tire casing disclosed in Figure 5 taken on line 6—6 thereof; and Figure 7 is a plan view of a still further modification of a tire casing embodying the present invention with parts broken away to disclose details of the arrangement of the plies therein.

The tire constructions described hereinafter are applicable to tire casings of the type requiring an inner tube or to tubeless tires and both forms of tires are intended to be included by the term "tire casing" used hereinafter.

Figures 1 and 2 disclose one form of tire casing including an arrangement of plies therein which achieve the results sought by this invention, namely, of preventing deformation of the ground-contacting area of the tread by deviation stresses produced by cornering of the vehicle at relatively high speeds. A typical tire casing includes a carcass 10 having sidewalls 11 and 12 provided with beads 13 and 14 at their outer free edges. The edges of the sidewalls 11 and 12 are joined to the apex or tread portion 15 of the carcass which carries a ground-contacting tread band 16 and are reinforced by means of carcass or sidewall plies 17 and 18 which extend from the beads 13, 14 into the lateral edges of the apex or tread portion 15 of the tire casing. Adjacent to and overlapping the ends of the plies 17 and 18 is an apex ply 19 containing a plurality of cables 20 which are arranged in parallel relation and extend meridianally of the tire casing. Also, as best shown in Figure 1, the sidewall plies 17 and 18 contain parallel cables 21 and 22 which extend meridianally of the tire casing or perpendicular to its equator. It will be understood that the the sidewall plies 17 and 18 and the apex ply 19 can be a continuous ply extending from one bead to another.

In the center zone of the tread portion of the carcass are arranged two plies 23 and 24, each containing a plurality of parallel cables 25 and 26. As shown in Figure 1, the cables 25 of the ply 23 are inclined at an acute angle to the equator of the tire casing. Also, the cables 26 of the ply 24 are arranged at an acute angle to the equator of the tire casing and are also inclined to the cables 25 of the ply 23 so that the cables in the plies 23 and 24 cross and in conjunction with the meridianally disposed cables 20 of the ply 19 form a triangulated structure extending circumferentially of the tire casing in the central part of the tread zone 15 of the tire casing. The inclination of the cables 25 and 26 to the equator of the tire casing shown in Figures 1 and 2 and the tire casings described hereinafter is between 15° and 50°, or in the preferred embodiment, between 18° and 45° to the equator of the tire casing.

On opposite sides of the central band or zone are arranged strips or plies 27, 28, 29 and 30. The arrangement of the plies 27 and 28 is generally similar to the arrangement of the plies 29 and 30. Thus, the innermost ply 28 contains a series of parallel cables 31 which are inclined more sharply or at a smaller angle to the equator of the tire casing than the cables 25 and 26. The ply 27 also includes cables 32 in parallel relation which are inclined to the equator of the tire casing at about the same angle as the cables 31 but crossing these cables. The inclination of the cables 31 and 32 to the equator of the tire casing disclosed in Figures 1 and 2 and the tire casings described hereinafter may be varied between 0° and 30°, and in a preferred embodiment, between 0° and 24° to the equator of the tire casing. However, in all instances, the cables 31 and 32 should be more sharply inclined or at a smaller angle to the equator of the tire casing than the cables 25 and 26. The cables in the plies 29 and 30 are arranged similarly to the arrangement of the cables 31 and 32 so that in conjunction with the meridianal cables 20 in the ply 19 a triangulation of the cables is produced in which the triangles have more acute apex angles extending circumferentially of the casing than the triangles formed by the cables of the plies 23, 24 and 19. Due to the shape of the triangles, the lateral zones containing the plies 27, 28, 29 and 30 are much more rigid than the central zone containing the plies 23 and 24 and, hence, are much more resistant to deviation stresses than tire casings heretofore produced. The ply strips in each of the central and lateral zones of the apex of the tire casing shown in Figures 1 and 2, are of substantially equal widths, thereby rendering these zones of substantially equal width. However, the widths of each of the lateral zones of the tire casings disclosed herein can be decreased to as little as 20% of the apex width and the width of the central zone increased up to 60% of the width of the apex with completely satisfactory results.

While it is preferred to position the ply strips 23, 27 and 29 in edge-to-edge relation and the ply strips 24, 28 and 30 also in edge-to-edge relation, within the capabilities of the tire builder, slight overlapping or slight spacing apart of the edges of these strips is unobjectionable. By so arranging the strips, they form, in effect, two radially-spaced, continuous plies co-extensive with the apex of the carcass. Due to the overlapping relation of the radially-spaced plies and ply strips, they are strongly united, and expansion of the tire casing by internal pressures or forces acting on it while in use, is prevented.

If desired, the sidewall plies 17 and 18 can be omitted and the sidewalls formed of a rubber having a modulus of elasticity greater than 800 grams/mm.$^2$ at 100% elongation, as described more particularly in U. S. application Serial No. 558,785, filed January 12, 1956, now abandoned.

A modified form of tire casing according to the invention is disclosed in Figures 3 and 4. In this tire casing, the sidewalls 31 and 31a are devoid of carcass plies and are formed of rubber having a modulus of elasticity of at least 800 grams/mm.$^2$ at 100% elongation. However, conventional sidewall reinforcing plies or sidewall plies of the type disclosed in Figures 1 and 2 may be included in this form of tire casing. As shown in Figures 3 and 4, the tread zone of the tire casing includes two centrally-located plies 32 and 33, each containing parallel cables and each being substantially co-extensive with the apex or tread zone 34 of the tire casing. The cables 35 of the ply 32 are inclined at an acute angle in one direction relative to the equator of the tire casing, while the cables 36 of the ply 33 are inclined at about the same angle but in the opposite direction so that they cross the cables 35 of the ply 32. Above and below the lateral edges of the plies 32 and 33 are strips of ply material 37 and 38, each containing substantially parallel cables, the cables 39 of the ply 37 being inclined very sharply or at a very acute angle to the equator of the tire casing, while the cables 40 of the ply 38 are inclined at substantially an equal angle but in an opposite direction to cross the cables 39. At the opposite or left-hand edge of the casing are narrow ply strips 41 and 42 in which the cables thereof are inclined similarly to the cables 39 and 40 of the plies 37 and 38. Thus, in this form of tire casing, the central portion of the apex or tread zone is reinforced by two plies of crossing cables, while the lateral zones are reinforced by four plies of cables crossing each other at different angles, thereby forming a dense lattice or network of great lateral rigidity.

Another form of tire casing embodying the invention is shown in Figures 5 and 6. This tire casing includes a carcass 45 which is reinforced by means of a carcass ply 46 extending from one bead 47 through the sidewall 48, the tread zone 49, the opposite sidewall 50 to the bead 51 of the tire casing. The ply 46 contains a plurality of cables 52 which extend meridianally of the tire casing. Overlying the ply 46 at the central portion of the tread zone is a ply 53 containing a plurality of parallel cables 54 which are inclined at an acute angle to the equator of the tire casing. Overlapping the lateral edges of the ply 53 and extending outwardly to about the edges of the tread zone 49 are ply strips 55 and 56, each of which includes a plurality of parallel cables 57 and 58 inclined more sharply or at a smaller angle to the equator of the tire casing than the cables 54.

Overlapping the edges of the ply strips 55 and 56 is another centrally-located ply strip 59 containing parallel cables 60 which are inclined to the equator of the tire casing at about the same angle as the cables 54 but in the opposite direction so that the cables 60 and 54 cross each other.

Overlapping the edges of the ply 59 are a pair of ply strips 61 and 62, each containing parallel cables which are inclined at about the same angle as the cables 57 and 58 of the plies 55 and 56, but extending in a direction to cross the cables 57 and 58.

The combination and arrangement of the plies described above produces a triangulated arrangement of the cords in the central and lateral zones of the tread portion of the tire casing with the cords at the lateral sides being more sharply inclined than the cords in the central zone, thereby imparting increased rigidity to the lateral zones as compared with the central zone of the tread portion of the tire.

Figure 7 discloses a modification of the tire casing disclosed in Figures 1 and 2 but differing from that shown in Figures 1 and 2 in that the plies 65 and 66, instead of being formed of separate strips 23, 24 and 27 to 30, contain continuous cables 67 which are bent so that the mid-portion 67a of each cable is less sharply inclined with respect to the equator of the tire casing than the end portions 67b and 67c of the cables. The cables 68 of the ply 66 are also continuous from one edge of the tread zone to the other, but are inclined oppositely so that they cross the cables 67 and in conjunction with the meridianal cables 69 of the ply 70 form a triangulated structure in which the triangles at the lateral edges are sharper than the triangles at the mid-portion of the tread zone.

All of the forms of tire casings described above can be further modified in order to render the lateral portions of the tread zone even more rigid than the central portion of the tread zone. Thus, the cables 31 and 32 in the ply strips 27 and 28 and the cables in the ply strips 29 and 30 may be embedded in rubber having a higher modulus of elasticity than that normally used in tire casings, such as a modulus of at least 350 grams/mm.² at 100% elongation. Similarly, the lateral plies in the tires shown in Figures 3, 4, 5 and 6 may also be embedded in rubber of high modulus of elasticity. Also, if desired, the cables forming the lateral plies may be more rigid (either by using thicker cables or cables formed of stiffer materials) than the cables in the plies in the central zone of the tire in order to impart increased rigidity to the lateral portions of the tread zone of the tire casing. Moreover, the cables of the reinforcing plies in the lateral zones may be truly parallel to the equator, the direction of the cables of the plies in the central zone being different in each ply and inclined at a large angle to the equator.

It will consequently be understood that the forms of tires described above may be modified in various ways, and that the forms of the invention disclosed herein should be considered as illustrative and not as limiting the scope of the following claims.

We claim:

1. A pneumatic tire casing having an apex portion, sidewalls at opposite sides of said apex portion and a tread approximately coextensive with said apex portion, comprising a plurality of radially spaced, cable-containing plies in and substantially coextensive with said apex portion and extending circumferentially of said tire casing, the plies forming a central zone and two lateral zones parallel with the equator of the tire casing, the plies in the lateral zones overlapping the plies in the central zone a distance between one-fourth and one-sixth the width of the plies in the central zone, the cables in at least one of said plies in said central zone being inclined at a larger acute angle to said equator than the cables in the plies in said lateral zones.

2. The tire casing set forth in claim 1 in which cables of at least two plies in the central zone are crossed and disposed at an angle between about 15° and 50° to the equator of the tire casing, and cables in at least one ply in said lateral zones are parallel to said equator.

3. The tire casing set forth in claim 1 in which cables of at least two plies in the central zone are crossed and disposed at an angle between about 15° and 50° to the equator of the tire casing, and cables in at least two plies in said lateral zones cross each other and are disposed at an angle of up to 30° to said equator.

4. A pneumatic tire casing having an apex portion, sidewalls at opposite sides of said apex portion and a tread approximately coextensive with said apex portion, comprising two radially-spaced, cable-containing plies in and substantially coextensive with said apex portion and extending circumferentially of said tire casing, said plies forming a central zone and two lateral zones parallel with the equator of the tire casing, the cables in each of said two plies being substantially parallel, each cable having opposite end portions adjacent the edges of the ply inclined at an acute angle to said equator and a central portion inclined at a larger acute angle to said equator.

5. The tire casing set forth in claim 4 in which the end portions of said cables are inclined at an angle up to 30° to said equator and the central portion is inclined at an angle between about 15° and 50° to said equator.

6. The tire casing set forth in claim 4 in which the cables in one of said two plies are inclined with respect to and cross the cables in the other of said two plies.

7. A pneumatic tire casing having an apex portion, sidewalls at opposite sides of said apex portion and a tread approximately coextensive with said apex portion, comprising a plurality of radially-spaced, cable-containing plies in and substantially coextensive with said apex portion and extending circumferentially of said tire casing, the plies forming a central zone and two lateral zones parallel with the equator of the tire casing, the cables in at least one of said plies in said central zone being inclined at a larger acute angle to said equator than the cables in the plies in said lateral zones to render the lateral zones more rigid than the central zone, the cables in one of said plies crossing the cables in another radially-spaced ply at acute angles in the central and lateral zones, and other cable-containing plies extending across at least said lateral zones, the cables in said other plies crossing the cables in said radially-spaced plies to form triangles therewith.

8. The tire casing set forth in claim 7 in which said other plies extend into and reinforce said sidewalls.

9. A pneumatic tire casing having an apex portion, sidewalls at opposite sides of said apex portion and a tread approximately coextensive with said apex portion, comprising a plurality of radially-spaced, cable-containing plies in and substantially coextensive with said apex portion and extending circumferentially of said tire casing, the plies forming a central zone and two lateral zones parallel with the equator of the tire casing, the cables in at least one of said plies in said central zone being inclined at a larger acute angle to said equator than the cables in the plies in said lateral zones and said cables in said lateral zones being more rigid than the cables in said central zone to render the lateral zones more rigid than the central zone.

10. A tire casing comprising an apex portion, sidewalls at opposite sides of said apex portion and a tread on said apex portion substantially coextensive therewith, said apex portion containing a plurality of cable-reinforced plies extending circumferentially of said tire casing in central and lateral zones substantially coextensive with said apex portion, the cables in each ply being parallel and the cables of at least one ply in each zone crossing the cables of another ply in each zone, the cables in said one ply in the central zone of said apex portion extending at an acute angle to the equator of said tire casing, the cables in said one ply in said lateral zones extending at a smaller acute angle to said equator than the cables in the central zone, the plies in said central and lateral zones being separate cable-containing strips, and said plies in said lateral zones overlapping the edges of said ply in said central zone.

11. A pneumatic tire casing having an apex portion, sidewalls at opposite sides of said apex portion and a tread approximately coextensive with said apex portion, comprising a plurality of radially-spaced, cable-containing plies in and substantially coextensive with said apex portion and extending circumferentially of said tire casing, the plies forming a central zone and two lateral zones parallel with the equator of the tire casing, the cables in at least one of said plies in said central zone being inclined at a larger acute angle to said equator than the cables in the plies in said lateral zones to render the lateral zones more rigid than the central zone and at least one additional cable-containing ply overlapping the lateral zones, the cables in said another ply crossing the cables in said lateral zones at an angle to form triangles therewith.

12. A pneumatic tire casing having an apex portion, sidewalls at opposite sides of said apex portion, and a tread approximately coextensive with said apex portion, comprising a plurality of radially-spaced, cable-containing plies in and substantially coextensive with said apex portion and extending circumferentially of said tire casing, the plies forming a central zone and two lateral zones parallel with the equator of the tire casing, the cables of at least two plies in the central zone being crossed and disposed at an angle between about 15° and 50° to the equator of the tire casing, and the cables in at least two plies in said lateral zones being disposed at an angle of 0° to 30° to said equator, the cables in said plies in said central zone being inclined at a larger acute angle to said equator than the cables in the plies in said lateral zones.

13. The tire casing set forth in claim 12 wherein the cables in said plies in said lateral zones are parallel to said equator.

14. A pneumatic tire casing having an apex portion, sidewalls at opposite sides of said apex portion and a tread approximately coextensive with said apex portion, comprising a plurality of radially-spaced, cable-containing plies in and substantially coextensive with said apex portion and extending circumferentially of said tire casing, the plies forming a central zone and two lateral zones parallel with the equator of the tire casing, the cables in one of said plies crossing the cables in another radially-spaced ply at acute angles in the central and lateral zones, other cable-containing plies extending across at least said lateral zones, the cables in said other plies crossing the cables in said radially-spaced plies to form triangles therewith, and the cables in the plies of said central zone being inclined at a larger acute angle to said equator than the inclined cables in the plies in said lateral zones.

15. A tire casing comprising an apex portion, sidewalls at opposite sides of said apex portion and a tread on said apex portion substantially coextensive therewith, said apex portion containing a plurality of cable-reinforced plies extending circumferentially of said tire casing in central and lateral zones substantially coextensive with said portion, and at least one additional cable-containing ply overlapping the lateral zones, the cables in each ply being parallel and the cables of at least one ply in each zone crossing the cables of another ply in each zone, the cables in said one ply in the central zone of said apex portion extending at an acute angle to the equator of said tire casing, the cables in said one ply in said lateral zones extending at a smaller acute angle to said equator than the cables in the central zone, and the cables in said additional ply crossing the cables in said lateral zones at an angle to form triangles therewith.

References Cited in the file of this patent

FOREIGN PATENTS

| | | |
|---|---|---|
| 677,166 | Great Britain | Aug. 13, 1952 |
| 700,435 | Great Britain | Dec. 2, 1953 |
| 1,120,113 | France | Apr. 16, 1956 |